US 6,692,661 B1

(12) United States Patent
Bedetti (10) Patent No.: US 6,692,661 B1
(45) Date of Patent: Feb. 17, 2004

(54) PROCESS FOR PARTIAL OXIDATION OF HYDROCARBONS

(75) Inventor: Gianfranco Bedetti, Milan (IT)

(73) Assignee: Casale Chemicals SA, Lugano-Besso (CH)

( * ) Notice: Subject to any disclaimer, the term of this patent is extended or adjusted under 35 U.S.C. 154(b) by 0 days.

(21) Appl. No.: 09/428,659

(22) Filed: Oct. 28, 1999

(30) Foreign Application Priority Data

Oct. 30, 1998  (EP) ............................................ 98203666

(51) Int. Cl.$^7$ ................................................. C07C 1/02
(52) U.S. Cl. .................. 252/373; 423/418.2; 423/648.1
(58) Field of Search ....................... 252/373; 423/648.1, 423/418.2

(56) References Cited

U.S. PATENT DOCUMENTS

| | | | |
|---|---|---|---|
| 3,874,592 A | | 4/1975 | Buschmann et al. |
| 4,400,180 A | * | 8/1983 | Marion et al. ............. 48/197 R |
| 4,778,484 A | * | 10/1988 | Najjar et al. .............. 48/197 R |
| 5,515,794 A | * | 5/1996 | Kassman et al. ........... 110/261 |
| 5,958,364 A | * | 9/1999 | Dunne et al. ................ 423/652 |
| 6,245,303 B1 | * | 6/2001 | Bentley et al. ............. 422/193 |

FOREIGN PATENT DOCUMENTS

| | | |
|---|---|---|
| EP | 0 180 249 | 5/1976 |
| EP | 0 291 111 | 11/1988 |
| FR | 1 155 927 | 5/1958 |
| GB | 1 387 516 | 3/1975 |
| GB | 2 151 348 | 7/1985 |
| LU | 81 372 | 9/1979 |

\* cited by examiner

*Primary Examiner*—Stanley S. Silverman
*Assistant Examiner*—Edward M. Johnson
(74) *Attorney, Agent, or Firm*—Sughrue Mion, PLLC (57) ABSTRACT

A process for the partial oxidation of hydrocarbons, wherein a hydrocarbon-comprising gas flow and a free oxygen-comprising gas flow are fed into a reaction chamber, comprising the steps of:—mixing and reacting a first portion of the free oxygen-comprising gas flow with a first flow comprising reacted gases circulating within the reaction chamber;—mixing a second portion of the free oxygen-comprising gas flow with the hydrocarbon-comprising gas flow in the reaction chamber obtaining a gas flow comprising both hydrocarbons and free oxygen at least partly mixed together—mixing and reacting the gas flow comprising both hydrocarbons and free oxygen at least partly mixed together with a second flow comprising reacted gases circulating inside the reaction chamber obtaining a gas flow comprising hydrogen and carbon monoxide.

11 Claims, 4 Drawing Sheets

PROCESS FOR PARTIAL OXIDATION OF HYDROCARBONS

FIELD OF THE INVENTION

This invention relates to a process for the partial oxidation of hydrocarbons to produce gaseous mixtures comprising hydrogen and carbon monoxide, such as synthesis gas, and fuel or reducing gas.

In particular, this invention relates to a partial oxidation process which comprises the steps of:
- feeding a hydrocarbon-comprising gas flow into a reaction chamber;
- feeding a free oxygen-comprising gas flow into said reaction chamber.

Throughout this specification and the appended claims, the term: "hydrocarbon(s)", is used to denote a light and/or heavy saturated and/or unsaturated hydrocarbon or hydrocarbon mixtures (e.g. $C_1$–$C_6$); the expression "hydrocarbon-comprising gas flow" is used to either denote a fluid which contains gaseous hydrocarbons, such as methane or natural gas, or a gaseous flow comprising suspended solid combustible (e.g., coal dust or carbon soot), or a gaseous flow comprising dispersed liquid hydrocarbons (e.g., such light or heavy hydrocarbons as naphtha or fuel oils).

In technical language, a gas flow which contains suspended liquid hydrocarbons is usually referred to as a "mist", while a gas flow which contains dispersed solid hydrocarbons is termed a "smoke".

The invention also concerns a burner for implementing the above process.

As is known, in the field of hydrocarbon partial oxidation there exists a pressing demand for a high yield process which can be easily implemented, and is both energy and cost efficient.

PRIOR ART

To fill the above demand, processes have been developed wherein the oxidation reaction is carried out at relatively low temperatures, on the order of 1300° C., to significantly reduce oxygen consumption and produce hydrogen and carbon monoxide more economically.

A process of this kind is described in EP-A-0 276 538, for example, wherein a hydrocarbon-comprising gas flow is first mixed with a recovered solution comprising carbon soot and then, following evaporation of the water contained in the solution, mixed with oxygen in a reaction chamber at a temperature in the 927° to 1316° C. range, the combustion to hydrogen and carbon monoxide taking place in that chamber.

While this prior process does afford a reduction in the energy consumption in the reaction chamber, as well as in the amount of oxygen to be fed into the reaction chamber, it has a number of disadvantages, as listed herein below.

First of all, the carbon soot formed from the hydrocarbons pyrolysed in the reaction chamber which, in the proximity of the burner, get in contact with and are admixed to the hot gases circulating within the chamber before they can be suitably mixed with oxygen.

This production of carbon soot is mainly disadvantageous in that a whole series of energy-intensive operations are made necessary for separating the carbon soot from the reaction products and feeding it back into the reaction chamber, that a more complicated plant is needed for implementing the process, and that capital and operating cost is high.

In addition, the carbon soot produced inside the reaction chamber affects the overall yield of the partial oxidation process, lowering the amount of hydrogen and carbon monoxide which can be obtained per unit of burned hydrocarbon, even where all the carbon soot produced and returned to the burner is gasified.

On the other hand, prior processes effective to produce low carbon soot concentrations involve operating the reaction chamber at very high temperatures (on the order of 1400° C.), and therefore, at a high rate of oxygen consumption and low conversion rate, for example as described in EP-A-0 276 538, page 2, lines 6–13.

In addition, the plants for implementing the aforementioned processes have a disadvantage in that they are inflexible in operation, being unable to accommodate the large load variations to which the reactants fed into the reaction chamber can be subjected, with the result that the variations may trigger or boost the formation of carbon soot.

It is on account of such limitations that prior art processes for the partial oxidation of hydrocarbons have involved large investment costs for their practical implementation, thereby significantly penalizing the production costs of such basic materials as hydrogen and carbon monoxide, and this in the face of a growing demand for them. Moreover, a pressing demand in the field for hydrocarbon waste matter as the residues from distillation processes in the oil industry to be burned off cannot be satisfactorily filled by the aforementioned prior processes.

SUMMARY OF THE INVENTION

The underlying technical problem of this invention is to provide an improved process for the partial oxidation of hydrocarbons, at high yield, which allows a high production of hydrogen and carbon monoxide per unit of burned hydrocarbon, while drastically lowering the formation of carbon soot even when operating at low temperatures, and is flexible and easy to implement for a reasonably low energy consumption and operating cost.

According to the present invention, the above problem is solved by a process as indicated above, which is characterized in that it further comprises the steps of:
- mixing and reacting a first portion of said free oxygen-comprising gas flow with a first flow comprising reacted gases circulating within said reaction chamber;
- mixing a second portion of said free oxygen-comprising gas flow with said hydrocarbon-comprising gas flow in said reaction chamber, obtaining a gas flow comprising both hydrocarbons and free oxygen at least partly mixed together;
- mixing and reacting said gas flow comprising both hydrocarbons and free oxygen at least partly mixed together with a second flow comprising reacted gases circulating inside said reaction chamber, obtaining a gas flow comprising hydrogen and carbon monoxide.

Throughout this specification and the appended claims, the expression: "gas flow comprising reacted gases", is used to denote a gas flow which contains $H_2O$, $CO_2$, trace hydrocarbons, $H_2S$, COS, and possibly $N_2$ and Ar circulating inside the reaction chamber, additionally to the partial combustion products, i.e. CO and $H_2$.

Advantageously, this invention enables the production of hydrogen and carbon monoxide per unit of burned hydrocarbon to be increased substantially relative to the prior art processes.

In fact, thanks to the step of mixing a portion of the free oxygen-comprising gas flow with the hydrocarbon-comprising gas flow within the reaction chamber, before the last-mentioned flow contacts the hot gases circulating inside the chamber, the formation of carbon soot during the following combustion step can be prevented or at least reduced drastically.

In this way, the conversion yield of the hydrocarbons in the reaction chamber will be only marginally—if not at all—affected by the presence of carbon soot, thereby ensuring an optimum production in hydrogen and carbon monoxide.

It should be noted that thanks to the present invention the formation of carbon soot in the reaction chamber can be totally suppressed when the flow being processed comprises gaseous hydrocarbons, and can be held down to a bare minimum even where the gas flow comprises liquid and/or solid hydrocarbons.

This result is advantageously obtainable even when operating at low temperatures, preferably in the 950° to 1300° C. range, and therefore, at a lower rate of oxygen consumption and higher yield (increased production in CO and $H_2$) than the prior art.

As an example, for the partial oxidation of natural gas—in a condition of total absence of carbon soot—the oxygen requirement can be kept lower than 210 moles $O_2$ per kilomole of dry gas produced, which represents quite a surprising achievement compared to the requirements for oxygen of prior art processes.

In other words, the process of this invention prevents a portion of the hydrocarbons flowing through the reaction chamber from becoming mixed, in the absence of oxygen, directly with the high-temperature (e.g., in the 1000° to 1400° C. range) gases circulating within the chamber, causing the hydrocarbons to be pyrolysed and carbon soot formed. On the contrary, inside the reaction chamber, the hydrocarbons are first suitably mixed with the free oxygen, and only later contacted with the hot gases, which gases will then trigger an advantageous combustion, rather than pyrolysis, reaction of the reactants at least partially pre-mixed, to produce hydrogen and carbon monoxide.

Furthermore, the process of this invention is quite simple, economical and easy to implement, and involves neither a high energy consumption nor high operating and maintenance costs.

It should be noted that for the combustion of gaseous hydrocarbons, such as methane or natural gas, the plant implementing this process requires no carbon soot separation and re-circulation section, thereby affording major savings in investment cost and energy consumption over prior art plants.

Advantageously, the present process has proved highly flexible, since it can accommodate a range of different operating conditions while retaining its high conversion yield.

In particular, this process can be effectively applied even in case of large variations in the rate of the flows fed to the reaction chamber, such as in the 0.2 to 1.0 range (ratio of minimum to maximum flow rate), without affecting the conversion yield, a feature this one that cannot be found in the prior art processes.

The portion of the free oxygen-comprising gas flow which gets mixed, inside the reaction chamber, with the hydrocarbon-comprising gas flow before contacting the re-circulated reacted gases, referred to as the second portion in the process according to the invention, advantageously comprises as from 10 to 90%, preferably 50 to 70%, of the free oxygen-comprising gas flow.

In a particularly advantageous embodiment of the invention, this process comprises the step of feeding the hydrocarbon-comprising gas flow and the free oxygen-comprising gas flow into the reaction chamber as respective, substantially annular jets coaxial with each other.

Thus, the mixing of the hydrocarbons and free oxygen can take place in a most effective and prompt manner inside the reaction chamber.

Moreover, it has been found that to promote the mixing action, it is more advantageous if the hydrocarbon-comprising gas flow is fed to the reaction chamber outwardly of and preferably at a higher velocity than the free oxygen-comprising gas flow.

Preferably, according to the above embodiment, the process of this invention further comprises the steps of:

causing said free oxygen-comprising gas flow to flow through a first, substantially cylindrical conduit of predetermined length of a burner extending into said reaction chamber;

causing said hydrocarbon-comprising gas flow to flow through a substantially annular free space defined between said first conduit and a second outer conduit coaxial with the first, said second conduit being longer than said first conduit and defining inside said reaction chamber—between one end of said second conduit and one end of said first conduit—a mixing zone for said hydrocarbon-comprising gas flow and said free oxygen-comprising gas flow;

directing said hydrocarbon-comprising gas flow from said substantially annular free space to a region of said mixing zone close to an inner wall of said second conduit;

expanding and directing said free oxygen-comprising gas flow exiting said first conduit toward said inner wall of said second conduit in said mixing zone, thereby to mix and react a first portion of said free oxygen-comprising gas flow with a first flow comprising reacted gases circulating inside said reaction chamber in a central zone thereof, and to mix a second portion of said free oxygen-comprising gas flow with said hydrocarbon-comprising gas flow obtaining a gas flow comprising both hydrocarbons and free oxygen at least partly mixed together.

In this way, a desired pre-mixing of the hydrocarbons and the free oxygen can be achieved in the reaction chamber in a highly effective and reliable manner, while preventing during this step all contact of the hydrocarbons with the reacted gases being circulated within the chamber.

Advantageously, this pre-mixing is made to occur at a part of the inner wall of the feed conduit for the hydrocarbon-comprising gas flow which extends between its end and the end of the feed conduit for the free oxygen-comprising gas flow.

In practice, part of the free oxygen-comprising flow is advantageously caused to enter the hydrocarbon-comprising flow, and a sufficient degree of mixing is attained in a very small space to prevent—in case of gaseous hydrocarbons— or drastically reduce—in case of liquid and/or solid hydrocarbons—the formation of carbon soot during the subsequent admixture to hot gases circulating inside the reaction chamber.

In order to promote the expansion and transport of the free oxygen-comprising gas flow toward the inner wall of the second conduit in the mixing zone, this gas flow is preferably caused to flow through the first conduit along a spiral flowpath.

According to a further aspect of the invention, a burner for the partial oxidation of hydrocarbons is provided which comprises:

a first, substantially cylindrical conduit of predetermined length which defines on its interior a circular passageway for feeding a free oxygen-comprising gas flow into a reaction chamber outside the burner;

a second conduit, outer of and coaxial with but longer than the first, which defines a substantially annular free space on its interior between said conduits, for feeding a hydrocarbon-comprising gas flow into said reaction chamber;

and is characterized in that it further comprises:

a mixing zone, wherein said hydrocarbon-comprising gas flow is mixed with said free oxygen-comprising gas flow, defined between respective ends of said first and second conduit;

means for directing said hydrocarbon-comprising gas flow from said substantially annular free space to a region of said mixing zone close to an inner wall of said second conduit;

means for expanding and directing said free oxygen-comprising gas flow exiting said first conduit toward said inner wall of said second conduit in said mixing zone, thereby to mix and react a first portion of said free oxygen-comprising gas flow with a first flow comprising reacted gases circulating within said reaction chamber in a central zone thereof, and to mix a second portion of said free oxygen-comprising gas flow with said hydrocarbon-comprising gas flow obtaining a gas flow comprising both hydrocarbons and free oxygen at least partly mixed together.

The features and advantages of the invention can be better understood by reading the following description of an embodiment of the inventive process, given by way of non-limitative example with reference to the accompanying drawings.

DETAILED DESCRIPTION OF A PREFERRED EMBODIMENT

Figure 1:
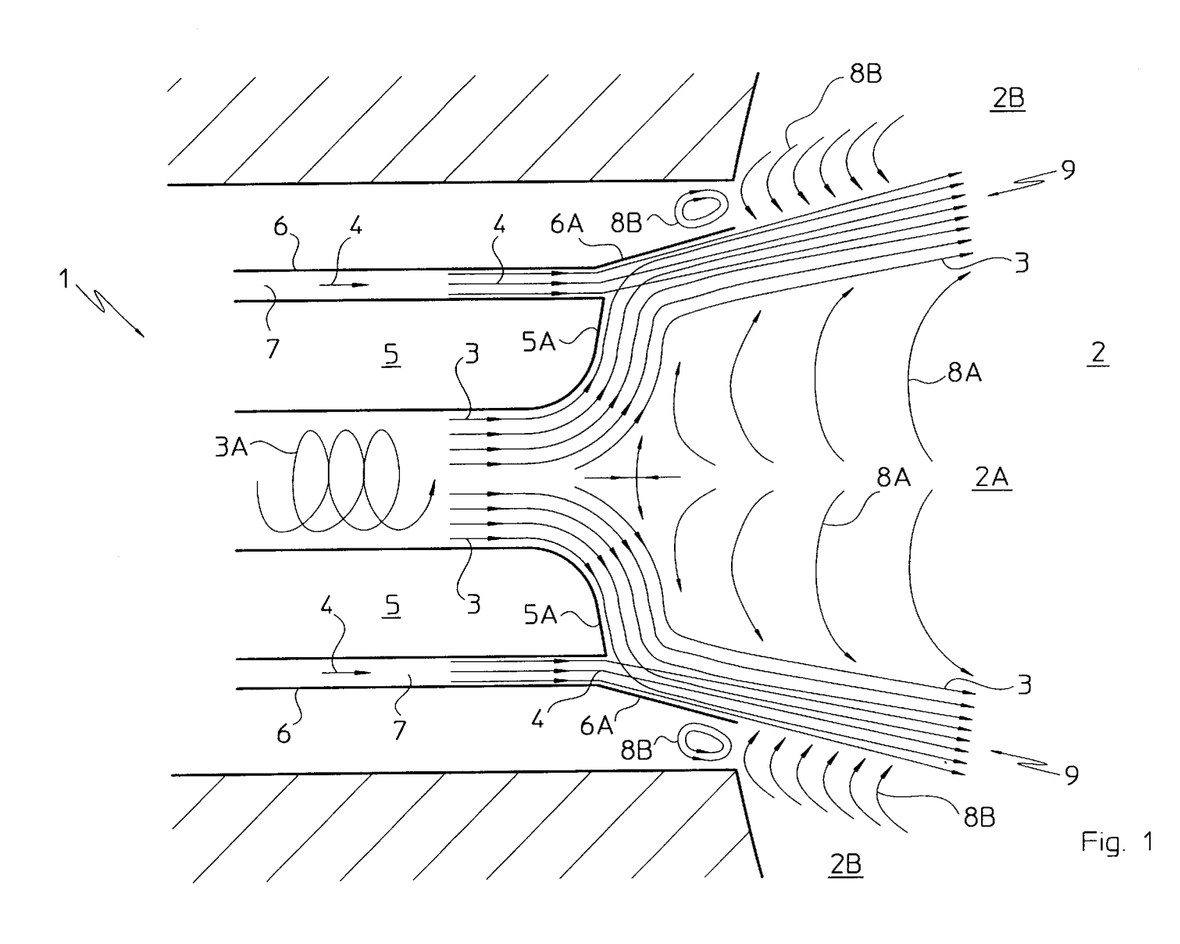
FIG. 1 is a longitudinal section view through a model which illustrates schematically the flowpaths of the reactant and reacted gases within a hypothetical gas generator when using the process for the partial oxidation of hydrocarbons according to a preferred embodiment of the present invention.

To explain the principle and operation of this process for the partial oxidation of hydrocarbons, reference is made to FIG. 1 which shows schematically the flowpaths of the various gas flows through a hypothetical gas generator operating in accordance with a preferred embodiment of the invention.

Schematically shown at 1 in FIG. 1 is the end portion of a burner extending into a reaction chamber generally denoted by 2 of a hypothetical gas generator, and specifically positioned in a central zone 2A of the chamber 2.

A free oxygen-comprising gas flow 3 and a hydrocarbon-comprising gas flow 4 are fed into the zone 2A from the burner 1 through respective conduits 5 and 6.

Specifically, the gas flows 3 and 4 are fed into the reaction chamber 2 in the form of annular jets, as preferably obtained by causing the flow 3 to flow in a spiral path through the conduit 5, as indicated in FIG. 1 by a spiral arrow 3A, and the flow 4 to flow through an annular free space 7 defined between the conduits 5 and 6.

Advantageously, by having the gas reactants fed to the reaction chamber 2 as annular jets, the flow which contains the reacted gases (e.g., hydrogen and carbon monoxide) from the combustion of the hydrocarbons splits up naturally into two flows 8A and 8B circulating within the central zone 2A and a peripheral zone 2B, respectively, of the reaction chamber 2.

Since the reacted gas-comprising flows 8A and 8B are quite hot, being generally at a temperature above 1000° C., their contact or admixture to the gaseous reactants flows causes immediate combustion with flame formation in the instance of the free oxygen-comprising flow 3, and pyrolysis of the hydrocarbons from the hydrocarbon-comprising flow 4.

To prevent such hydrocarbon pyrolysis from occurring, which is responsible for the formation of carbon soot in the reaction chamber 2, the process of the present invention comprises the step of mixing at least in part the hydrocarbons with the free oxygen prior to their admixture to the hot burned gases circulating inside the reaction chamber 2.

For the purpose, the conduit 6 is made longer than the conduit 5 and is formed with a frusto-conical tip 6A which extends into the reaction chamber 2.

Defined inside this tip 6A, specifically at a location near the inner wall of the conduit 6, is a mixing zone for the hydrocarbon-comprising gas flow 4 and the free oxygen-comprising gas flow 3 which is undisturbed by the reacted gas flow, specifically the flow 8B.

To promote an effective prompt mixing of the hydrocarbons with the free oxygen, the conduit 5 is provided with an expansion cone 5A at its end.

It is only after the hydrocarbons and the free oxygen have been at least partially mixed together obtaining a gas flow which contains hydrocarbons and free oxygen, generally denoted by 9, that the latter is mixed with the flow 8B and reacted to produce hydrogen and carbon monoxide.

The particular annular jet type of feed pattern provided for the reactants, with the free oxygen jet being flowed within the hydrocarbon jet, in combination with the central circulation of part of the reacted gases, advantageously allows some of the free oxygen to be mixed and then reacted with the reacted gases circulating in the central zone 2A of the reaction chamber 2, resulting in that the flame generated inside the chamber 2 is rooted in a stable and reliable manner centrally near the free oxygen inflow zone to the reaction chamber 2.

Furthermore, by flowing the oxygen centrally and the hydrocarbons outwardly, the tip 6A on the outer conduit 6 of the burner 1 can be used for mixing the reactants while protecting the hydrocarbons from the hot gases circulating in the peripheral zone 2B of the reaction chamber, as well as from the flame issuing from the core region of the burner 1.

To fully explain the features of this partial oxidation process, it should be pointed out that it is an entirely different process from the prior art mixing or diffusing processes.

The term mixing process means a process whereby the hydrocarbon-comprising gas flow and the free oxygen-comprising gas flow are mixed together—usually within the burner—before they are fed into the reaction chamber.

This mixing may be carried out either in a thorough fashion, that is until a flow with uniform concentrations of oxygen and hydrocarbons is obtained, or a partial fashion, that is with a concentrations field in the feed flow to the reaction chamber which will be dependent on the mixing procedure and extent.

A process of this kind is, for example, disclosed in EP-A-0 098 043.

Although in theory the mixing process is effective to keep down the production of carbon soot, it has found no practical application because of its inherently dangerous nature.

In fact, in operation of the gas generator, the risk of a backfire in the burner, i.e. of the oxidation reaction being triggered while still in the burner conduits, is always latent and may result in premature wear of the same. This is a near-uncontrollable phenomenon due to the high flammability of the hydrocarbon/oxygen mix, the high operating temperatures, and possible variations in the reactants flow rates.

The term diffusion process means a process whereby the hydrocarbon-comprising gas flow and the free oxygen-comprising gas flow are instead fed separately into the reaction chamber, where they are mixed simultaneously together and with the reacted gases present and circulating in the chamber.

A process of this kind is, for example, that disclosed in the above-mentioned EP-A-0 276 538.

The drawbacks of this conventional process have been described hereinabove in connection with the state of the art; in particular, its high rate of carbon soot production is noteworthy, which is due to the high-temperature recirculated gases contacting, inside the reaction chamber, incoming hydrocarbons which have had no chance of getting suitably mixed with the free oxygen.

In relation to the present invention, it should be stressed that the provision of a preliminary mixing step within the reaction chamber for the hydrocarbon-comprising gas flow with the free oxygen-comprising gas flow, before the hydrocarbons can contact the reacted gases, contradicts the prior art teachings that the reactants should either be mixed before introducing them into the reaction chamber or only after their introduction simultaneously with the reacted gases.

It is the research work carried out by the Applicant that led to a partial oxidation of hydrocarbons at a high yield with no or markedly reduced production of carbon soot.

In essence, it can be said that the inventive process reflects a sort of combination of the aforesaid processes, but without their problems and with a substantially higher yield of the conversion to hydrogen and carbon monoxide under like conditions of operation.

Figure 2:
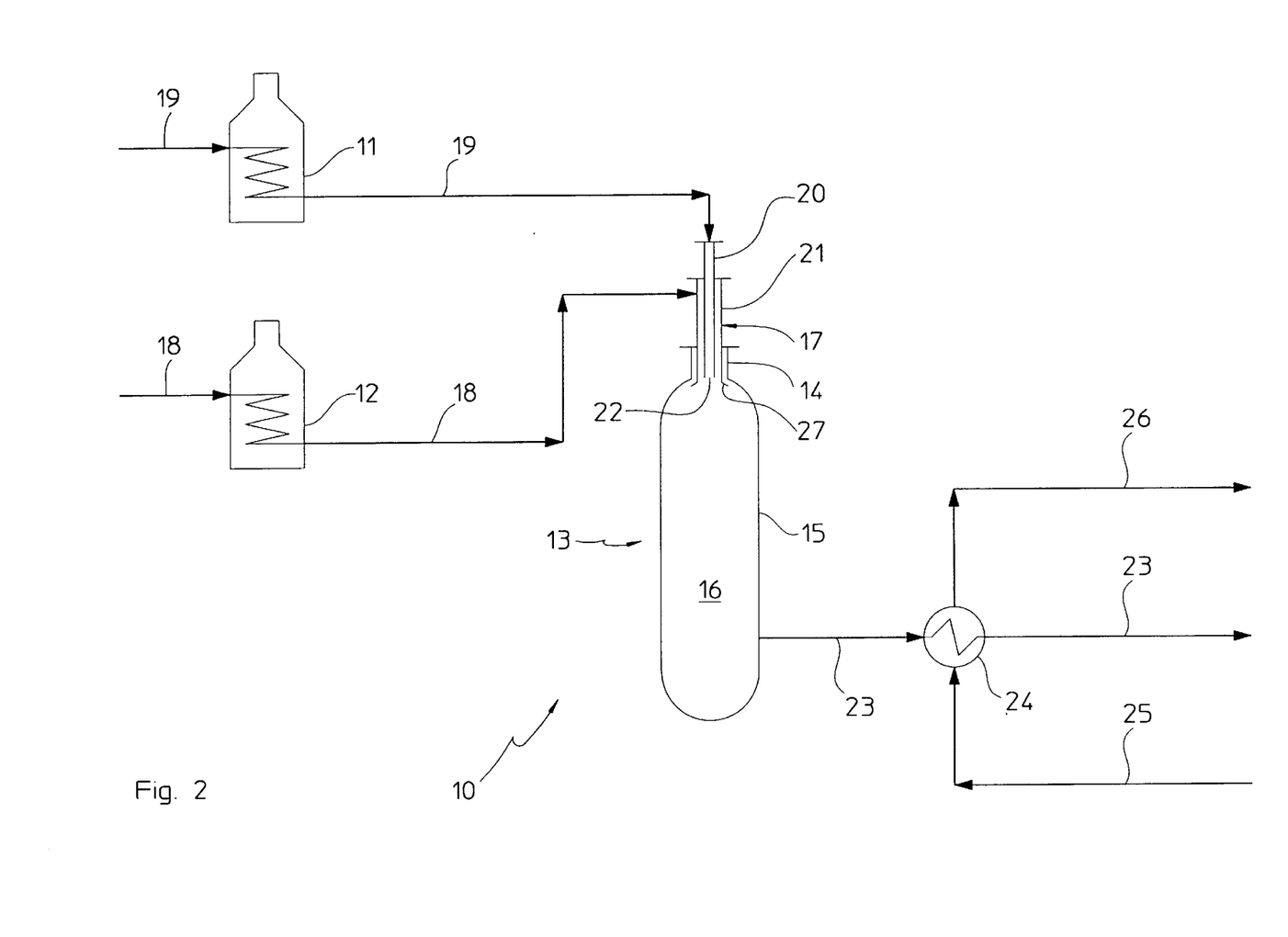
FIG. 2 shows schematically a plant for the partial oxidation of gaseous hydrocarbons implementing the process of the present invention.

In FIG. 2, generally shown at 10 is a plant for the partial oxidation of gaseous hydrocarbons according to the present invention.

Advantageously, the plant 10 comprises two pre-heaters 11 and 12, respectively for pre-heating a hydrocarbon-comprising gas flow and a free oxygen-comprising gas flow, a gas generator 13 for partially oxidizing the hydrocarbons, and a boiler 24 for recovering the sensible heat from the resultant gas flow comprising hydrogen and carbon monoxide.

The pre-heaters 11 and 12 and the boiler 24 are conventional and no further described hereinafter.

The gas generator 13 comprises a nozzle 14 and a shell 15 which is lined with a high temperature-resistant refractory material, not shown because conventional, for protection of its inner walls.

The shell 15 interior forms a reaction chamber 16 wherein the combustion of the hydrocarbons with the oxygen takes place.

A burner 17 extends through the nozzle 14 such that its end portion opens to the interior of the reaction chamber 16.

The hydrocarbon-comprising gas flow is fed to the gas generator 13 by means of a conduit 18 passing through the pre-heater 12.

Likewise, the free oxygen-comprising gas flow is fed to the gas generator 13 by means of a conduit 19 passing through the pre-heater 11.

In the example of FIG. 1, the hydrocarbon-comprising gas flow comprises essentially gaseous hydrocarbons, such as natural gas or methane and mixtures thereof, and mixtures of these gases with such carrier gases as steam or inert gases.

In addition, the hydrocarbon-comprising gas flow may include predetermined amounts of gases from industrial plants, e.g. from the synthesis loop of an ammonia plant.

Alternatively, the hydrocarbon-comprising gas flow may comprise a carrier gas—such as an inert gas or steam—having a finely divided liquid or solid fuel respectively dispersed or suspended therein.

The expression "finely divided" is used here to denote droplets or solid particles of an average size in the 0.01 to 1.0 mm range.

Examples of suitable liquid fuels for use in the process of the present invention include: fuel oil, diesel oil, naphtha, crude oil, or residues from the distillation sections of oil plants, and mixtures thereof. Examples of solid fuels include: asphalts and coals, and mixtures thereof.

Where liquid or solid hydrocarbons are used, the plant of FIG. 1 should include a processing and recovery section, not shown, for any carbon soot produced.

The free oxygen-comprising gas flow generally comprises a gas selected from a group including air, enriched air with oxygen, i.e. air having an oxygen content in excess of 21 molar percent, substantially pure oxygen, i.e. a gas with an oxygen content of no less than 95 molar percent, and mixtures thereof.

The gas flows are heated independently through the pre-heaters 2 and 3, as by convection to a temperature which is usually lower than about 600° C., preparatory to feeding the gas flows into the gas generator 13.

The plant 10 implementing the process of this invention may also be provided with a conventional desulphurization unit, not shown in FIG. 2, for removing any trace sulphur from the hydrocarbon-comprising gas flow.

The working pressure inside the gas generator 13 is generally in the range of 1 to 150 bar.

After pre-heating, the gas flows are fed into the gas generator 13 or, more precisely, into the reaction chamber 16 through respective conduits of the burner 17.

In particular, the free oxygen-comprising gas flow is fed into the reaction chamber 16 through a circular passageway defined inside a first, substantially cylindrical conduit 20 having a predetermined length.

The hydrocarbon-comprising gas flow is fed into the reaction chamber 16 through an annular free space formed between the first conduit 20 and a second outer conduit 21, coaxial with but longer than the first.

Advantageously, the burner 17 further comprises a mixing zone 22 defined inside the reaction chamber 16 between respective ends of the conduits 20 and 21, where the reactants are pre-mixed before being admixed to the flow of reacted gases circulating in the chamber.

Immediately upon leaving the mixing zone 22, in the reaction chamber 16, the mixing of reactants is completed and the subsequent partial oxidation reaction of the hydrocarbons carried out, obtaining a gas flow which contains hydrogen and carbon monoxide and will leave the gas generator 13 via the conduit 23.

The oxygen-to-hydrocarbon molar ratio may vary between 0.5 and 1.2, according to the degree of purity of the free oxygen-comprising gas flow, the extent of the reactant pre-heating, and the type of the hydrocarbon flow mix.

The reaction products are subsequently flowed—again via the conduit 23—through the boiler 24 where they are cooled by indirect exchange of heat with a water flow, to release steam at an elevated thermal level (e.g. in the 20 to 100 bar range).

For the purpose, conduits 25 and 26 are provided for respectively supplying water into the boiler 24 and exhausting steam therefrom.

The provision of the boiler 24 in the plant of FIG. 2 depends basically on the nature of the fuel being handled. Where the latter yields a raw gas comprising hydrogen and carbon monoxide with a high content of impurities, it is cooled by a simple quenching device using water (not shown).

The plant 10 just described can advantageously implement the process of this invention, which process is characterized in particular by the fact of comprising the steps of mixing and reacting a first portion of the free oxygen-comprising gas flow with a first flow comprising reacted gases circulating inside the reaction chamber 16, and mixing a second portion of the free oxygen-comprising gas flow with the hydrocarbon-comprising gas flow in the mixing zone 22 of the reaction chamber 16, to obtain a gas flow comprising both hydrocarbons and free oxygen at least partly mixed together, and of mixing and reacting the gas flow thus obtained in the zone 22 with a second flow comprising reacted gases circulating inside the reaction chamber 16 to obtain a gas flow comprising hydrogen and carbon monoxide.

In this way, the production of carbon soot can be suppressed or significantly attenuated even when operating at low temperatures (below 1300° C.), so that the consumption of oxygen can advantageously be limited and the output of hydrogen and carbon monoxide improved accordingly.

As said before, the process can be carried out effectively even with significant variations occurring in the flow rates of the reactant flows, without this affecting negatively the conversion yield.

It should be noted that the process of this invention can suppress the production of carbon soot completely where flows comprising gaseous hydrocarbons are handled.

The absence of carbon soot is essentially dependent on the reactant pre-mixing step within the reaction chamber 16 and, therefore, on the presence of free oxygen in the hydrocarbon-comprising gas flow during the subsequent mixing with the hot circulating gases.

To promote a thorough mixing of the reactants and their subsequent combustion, it has been found advantageous to deliver the hydrocarbon-comprising gas flow to the reaction chamber 17 at a velocity in the range of 30 to 300 m/s, preferably 60 to 180 m/s, and the free oxygen-comprising gas flow at a velocity in the range of 10 to 100 m/s, preferably 20 to 60 m/s.

In a specially preferred and advantageous embodiment of the process according to the present invention, the process further comprises the steps of causing the free oxygen-comprising gas flow to flow through the first conduit 20, causing the hydrocarbon-comprising gas flow to flow through the annular free space defined between the first conduit 20 and the second conduit 21, directing the hydrocarbon-comprising gas flow from the annular free space to the mixing zone 22 at a location close to an inner wall 27 of the second conduit 21, and expanding and directing the free oxygen-comprising gas flow exiting the first conduit 20 toward the inner wall 27 of the second conduit 21 in the mixing zone 22.

In this way, the free oxygen and the hydrocarbons can be suitably pre-mixed in a quick efficient manner, while protecting the hydrocarbons from the hot gases circulating in the reaction chamber 16, as well as from the flame issuing from the core end of the burner 17 within the chamber 16.

Figure 3:
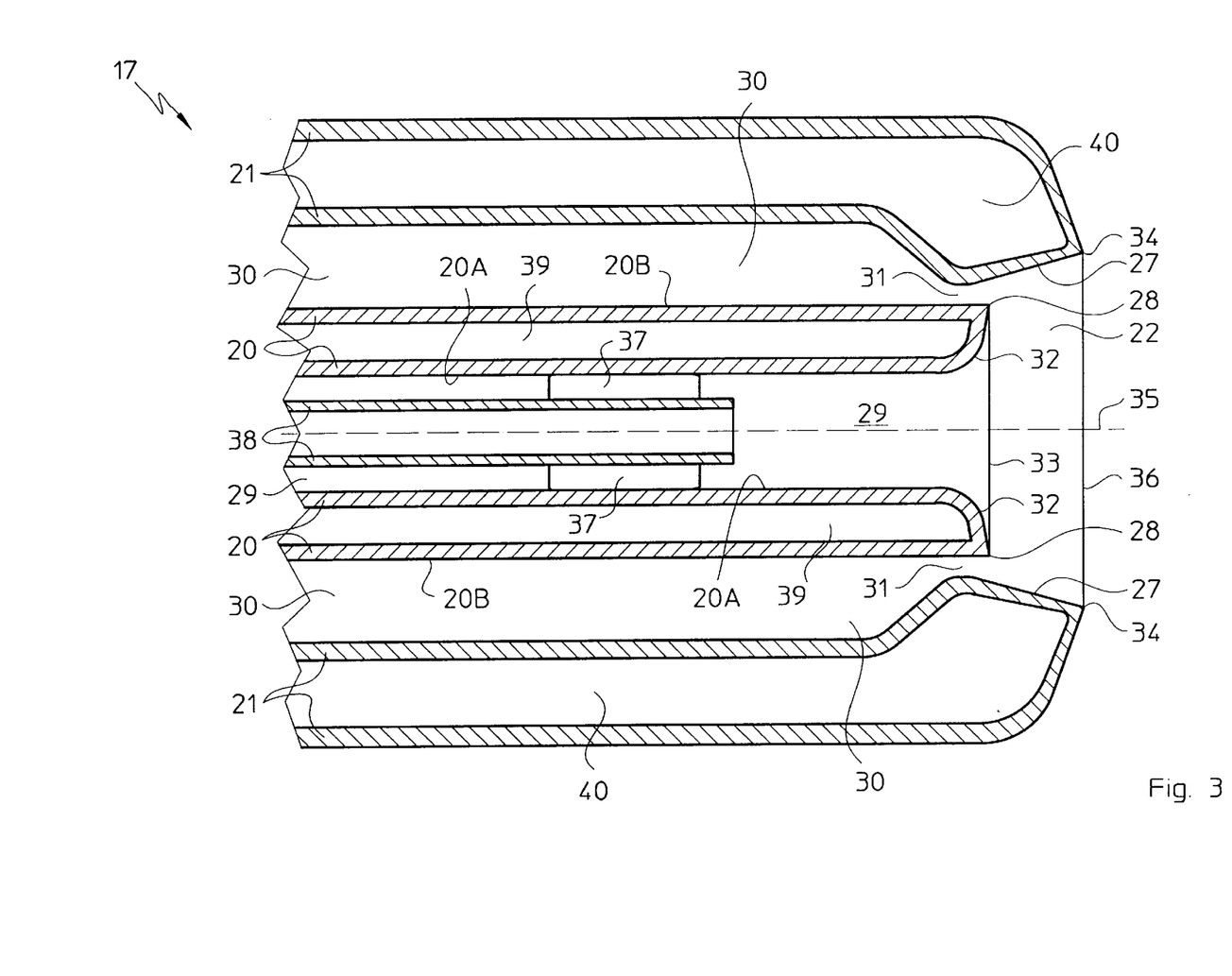
FIG. 3 shows a longitudinal section view of a detail of a burner according to a preferred embodiment of the present invention.

As shown in FIG. 3, the burner 17 advantageously comprises for this purpose—additionally to the conduits 20 and 21—suitable means for directing the hydrocarbon-comprising gas flow from the annular free space 31 to the mixing zone 22 in the reaction chamber 17, at a location close to the inner wall 27 of the second conduit 21, and comprises suitable means for expanding and directing the free oxygen-comprising gas flow exiting the first conduit 20 toward the inner wall 27 of the second conduit 21, in the mixing zone 22.

FIG. 3 is a detail view of the burner 17, specifically to illustrate the burner end portion, according to a preferred embodiment of the present invention.

In this figure, structurally and functionally equivalent items to those shown in FIG. 2 have the same reference numerals and will be no further described.

It should be noted that the conduits 20 and 21 of the burner 17 are of hollow construction for a more effective cooling thereof, as explained hereinafter.

The end of the first conduit 20, the circular passageway formed inside the first conduit 20, and the annular free space defined between the second conduit 21 and the first conduit 20 of the burner 17 are denoted in FIG. 3 by the reference numerals 28, 29 and 30, respectively.

Advantageously, in order to speed up the hydrocarbon-comprising gas flow sweeping across the inner wall 27 of the second conduit 21 at the mixing zone 22, the means for directing the hydrocarbon-comprising gas flow comprise an annular opening 31 thinner than the annular free space 30, which is formed at the end 28 of the first conduit 20, between the free space 30 and the mixing zone 22.

The means for expanding and directing the free oxygen-comprising gas flow advantageously comprise, located close to the end 28 of the first conduit 20, a portion of this conduit which suitably flares out toward the inner wall 27 of the second conduit 21 so as to define, at said end 28, a gas outflow opening 33 between the passageway 29 and the mixing zone 22 which has a larger diameter than the rest of the first conduit 20.

Thus, the free oxygen-comprising gas flow will be deflected and expanded toward the wall 27 of the second conduit 21, thereby ensuring optimum penetration of this flow into the hydrocarbon flow.

The diameter of the opening 33 may vary between 1.25 and 10 times the diameter of the first conduit 20 upstream of the portion 32, and satisfactory results have been obtained in the 2 to 4 times range.

As can be seen from FIG. 3, the flared portion 32 of the first conduit 20 is advantageously curved to allow a controlled and as even as possible expansion of the oxygen-comprising gas flow, while assisting in directing it toward the inner wall 27 of the second conduit 21 at the mixing zone 22.

In accordance with the process of this invention, the free oxygen-comprising gas flow is advantageously caused to flow from the passageway 29 to the mixing zone 22 through the outlet opening 33 of the first conduit 20. In parallel therewith, the hydrocarbon-comprising gas flow is advantageously flowed from the free space 30 to the mixing zone 22 through the annular opening 31 defined in the reaction chamber 16 between the end 28 of the first conduit 20 and the end 34 of the second conduit 21, proximate to its inner wall 27.

Advantageously, according to a specially preferred aspect of the present invention, the portion 32 extends continuously from an inner wall 20A to an outer wall 20B of the conduit 20, at a constant slope angle from the end of the inner wall 20A to the end of the outer wall 20B, or preferably, at a slope angle which varies continuously from 0° at the end of the inner wall 20A to at most 90° at the end of the outer wall 20B. Thus, the end of the outer wall 20B forms the end 28 of the conduit 20, and the end of the outer wall 20A is coincident with the cylindrical end of the conduit 20.

This unique configuration of the portion 32 of the conduit 20 for feeding the free oxygen-comprising gas flow into the reaction chamber 16 allows the rate of thermal wear of the end portion of that conduit near the end 28 to be slowed down considerably In fact, a study by the Applicant has shown that the absence of any sharp corners in the portion 32, that is in the portion connecting the inner wall 20A to the outer wall 20B of the conduit 20, is effective to prevent formation of whirls or stagnant regions in the free oxygen-comprising gas flow at that portion 32, thereby guarding it against premature thermal wear. On the contrary, according to the invention, the oxygen advantageously moves in a continuous linear flow along the portion 32 before leaving the conduit 20, while maybe cooling its surface.

In particular, the initial contact of the hydrocarbon-comprising gas flow flowing through the conduit 21 with the free oxygen-comprising gas flow flowing through the conduit 20 is advantageously made to occur at the end 28 of the conduit 20.

It should be noted that the oxygen feed conduits of the burners had a life span of no more than a few months in prior art arrangements, whereupon they had to be replaced and the whole plant stopped in consequence.

Thanks to the present invention, the life expectation of the end portion of such conduits is much longer, and this can last several years between replacements, so that the plant can be run consecutively for long time periods. In this way, the plant maintenance and operating costs, and production losses, can be reduced.

In particular, the curved shape of the portion 32 (shown in FIG. 3) ensures optimum results as regards durability of the conduit 20.

In this respect, satisfactory results have been obtained especially by adopting a slope angle of 30° to 90°, preferably 45° to 80°, for the portion 32.

According to a particularly advantageous aspect of the inventive burner, the length of the inner wall 27 of the second conduit 21 at the mixing zone 22, as measured between the respective ends 28 and 34 of the conduits 20 and 21, is set by the thickness dimension (cross-sectional area) of the annular opening 31 between the conduits 20 and 21.

Preferably, this length will be 5 to 15 times said thickness dimension.

So doing, it is possible to adjust in an optimum manner (neither too much nor too little) for a desired amount of reactants pre-mixing.

According to an advantageous further aspect of the inventive burner, the inner wall 27 of the second conduit 21 at the mixing zone 22 has a diameter which increases toward the end 34, so that the mixing zone 22 takes a frusto-conical shape.

In particular, the slope angle of the inner wall 27 of the second conduit 21 in the mixing zone 22 is advantageously in the range of 0° to 60°, preferably 10° to 30°, from the longitudinal axis 35.

The aforesaid frusto-conical shape of the mixing zone 22, with its major circumference being defined by the opening 36 of the burner 17 and its minor circumference defined by the inner wall 27 of the second conduit 21 at the end 28 of the first conduit 20, serves essentially a dual function of keeping the hydrocarbon-comprising gas flow away from the central flame and of enlarging the width of the inner recovery zone (reference 2A, FIG. 1), so as to achieve full stabilization (rooting) for the flame.

Advantageously, the burner 17 can also include suitable means for forcing upon the free oxygen-comprising gas flow a spiral flowpath through the first conduit 20, to further promote the expansion and transport of that flow toward the inner wall 27 of the second conduit 21 at the mixing zone 22.

In the example of FIG. 3, these means comprise one or more suitably shaped vanes 37, optionally set at an angle to the longitudinal axis 35, located proximate to one end of a rod-like holder, represented in FIG. 3 by the conduit 38 which extends for a predetermined length coaxially through the passageway 29 defined by the conduit 20.

The vanes 37 are shaped to impart a desired swirling motion to the gas flow. Preferably, a plurality of such vanes 37 are arranged helically around the conduit 38.

In an alternative embodiment, not shown, these means may be a suitable shaping of either the conduit 20 or the conduit 38.

In FIG. 3, the conduit 38 is shown open because it advantageously serves the additional function of affording, in a simple reliable manner, control on the reacted gas-comprising gas flow which is circulated centrally of the reaction chamber 16, as well as on the flame rooting position.

To this aim, a part of the free oxygen-comprising gas flow is caused to flow through the interior of the conduit 38 in a true axial flow which will oppose the reacted gas flow sweeping across the central conduit 20.

Alternatively, the conduit 38 could be used, during the refractory heating step inside the gas generator, to deliver fuel to the reaction chamber 16. In this way, the burner 17 can be used advantageously for the gas generator heating operation as well, doing away with the need for an additional purposely provided burner.

Indicated at 39 and 40, moreover, are recesses in the walls of the first conduit 20 and the second conduit 21 for admitting a liquid coolant, preferably water.

Thus, the temperature of the conduits 20 and 21 can be effectively controlled, particularly at their ends 28 and 34, to prevent overheating and likely rapid deterioration thereof.

Under certain conditions of operating temperature, this cooling can be forfeited.

Figure 4:
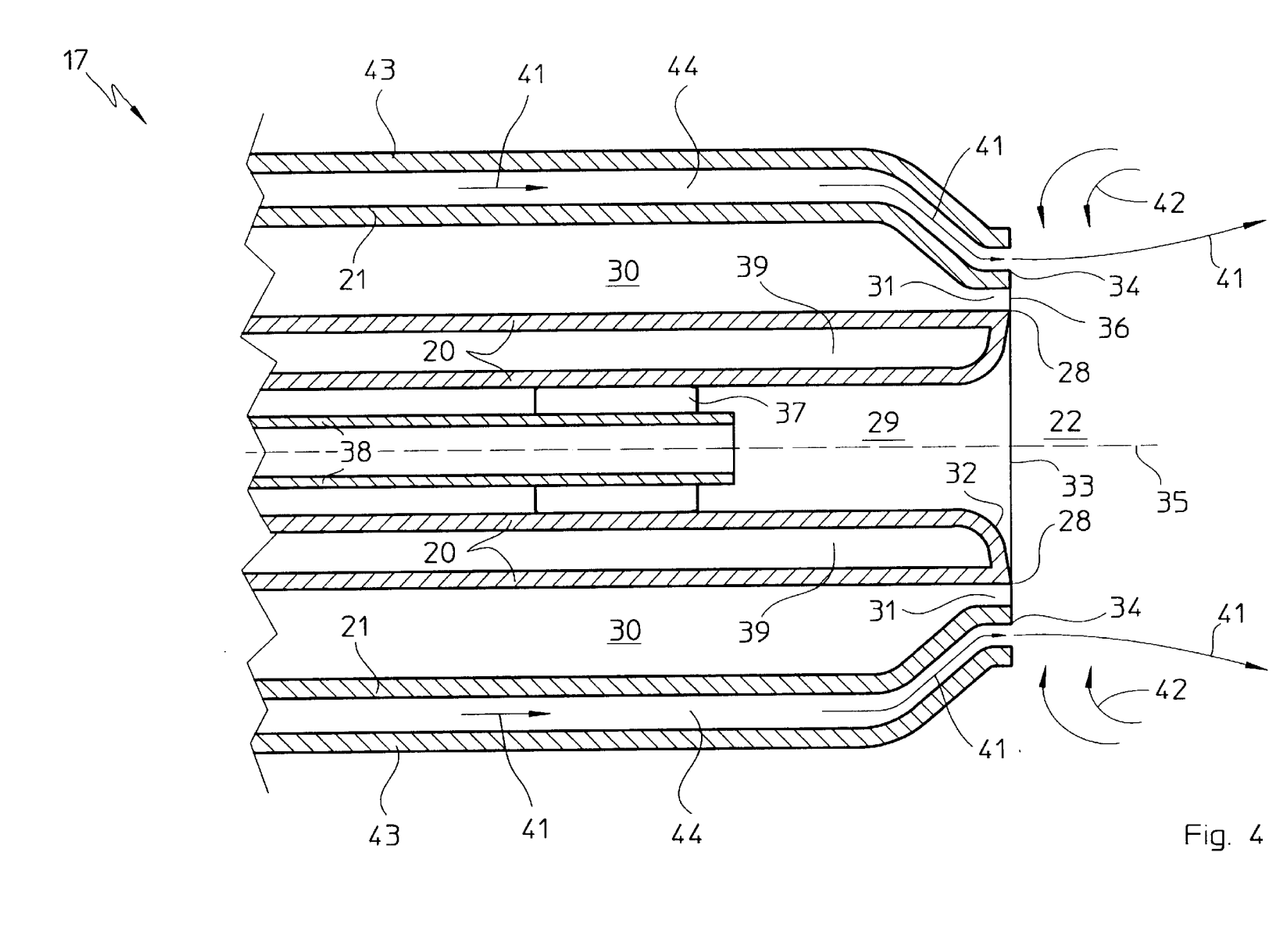
FIG. 4 shows a longitudinal section view of a detail of a burner according to another embodiment of the present invention.

FIG. 4 is a detail view of a burner according to a further embodiment of this invention.

In the figure, structurally and functionally equivalent items of the burner 17 to those shown in FIG. 3 are denoted by the same references and will not be further described.

In accordance with this embodiment of the burner 17, the same protective effect as provided by the inner wall 27 of the second conduit 21 at the mixing zone 22 (FIG. 3), is now provided by a substantially annular jet, e.g. of steam or inert gases, supplied to the reaction chamber 16 outwardly of the hydrocarbon-comprising flow.

This additional or protective flow, as indicated by arrows 41 in FIG. 4, is effective (similar to the wall 27 in FIG. 3) to isolate the mixing zone 22 from the reacted gas-comprising flow (arrows 42) circulating in the peripheral zone of the reaction chamber 16. The arrows 42 correspond to the arrows 8B of FIG. 1.

According to this embodiment, instead of increasing the length of the second conduit 21 relative to the first conduit 20, suitable means are provided for letting in a protective gas flow (arrows 41) comprised, preferably, of steam and/or inert gases.

For example, these inlet means may be a third conduit 43 placed externally of and coaxially with the conduits 20 and 21. The numeral 44 denotes an annular free space defined between the third conduit 43 and the second conduit 21 of the burner 17.

In accordance with the process of this particular embodiment of the invention, a gas flow comprising steam and/or inert gases is caused to flow through the conduit 43, to enter the reaction chamber 16 in the form of a substantially annular jet that defines a mixing zone 22 on its interior. At the same time, the free oxygen-comprising gas flow is caused to flow through the passageway 29 to the mixing zone 22 via the outlet opening 33 of the first conduit 20, and in parallel therewith, the hydrocarbon-comprising gas flow is caused to flow through the free space 30 to the mixing zone 22 via the annular opening 31 defined between the end 28 of the first conduit 20 and the end 34 of the second conduit 21.

The process for the partial oxidation of hydrocarbons, and in particular the pre-mixing in the zone 22 of the hydrocarbon-comprising gas flow with a second portion of the free oxygen-comprising gas flow, in a condition of no contact with the hot gases circulating in the reaction chamber 16, are carried out in a similar manner, and afford the same advantages, as discussed hereinabove in relation to the previous figures.

In the example of FIG. 4, the gas flow 41 comprising steam and/or inert gases, by sweeping across the outer wall of the conduit 21, has advantageously a cooling effect on that conduit, particularly at its end. Accordingly, the conduit 21 can be made of solid construction rather than hollow as shown in FIG. 3.

The manifold advantages afforded by the process of this invention can be fully appreciated from the foregoing description; in particular, a reaction of partial oxidation of the hydrocarbons can be performed:

in the complete absence of carbon soot, for gaseous hydrocarbons, with a simplified process-implementing plant;

with a drastic reduction of carbon soot, in the instance of liquid or solid hydrocarbons;

at low rates of oxygen consumption and a high yield of conversion to hydrogen and carbon monoxide per unit of burned hydrocarbon; and with longer burner life expectations.

What is claimed is:

1. A process for the partial oxidation of hydrocarbons, comprising the steps of:

feeding a hydrocarbon flow into a reaction chamber;

feeding a free oxygen flow into said reaction chamber;

said flows being fed to said reaction chamber independently, one from the other, and without being mixed together;

mixing and reacting a first portion of said free oxygen flow with a first flow comprising reacted gases circulating within said reaction chamber;

simultaneously mixing a second portion of said free oxygen flow with said hydrocarbon flow in said reaction chamber, obtaining a flow comprising both hydrocarbons and free oxygen at least partly mixed together;

mixing and reacting said flow comprising both hydrocarbons and free oxygen at least partly mixed together with a second flow comprising reacted gases circulating inside said reaction chamber, obtaining a gas flow comprising hydrogen and carbon monoxide.

2. The process according to claim 1, wherein said hydrocarbon flow and said free oxygen flow are fed into said reaction chamber as respective substantially annular jets, coaxially with each other.

3. The process according to claim 2, wherein the hydrocarbon flow is caused to flow outwardly of the free oxygen flow.

4. The process according to claim 2, wherein it further comprises the steps of:

causing said free oxygen flow to flow through a first, substantially cylindrical conduit of predetermined length of a burner extending into said reaction chamber;

causing said hydrocarbon flow to flow through a substantially annular free space defined between said first conduit and a second outer conduit coaxial with the first, said second conduit being longer than said first conduit and defining inside said reaction chamber, between one end of said second conduit and one end of said first conduit, a mixing zone for said hydrocarbon flow and said free oxygen flow;

directing said hydrocarbon flow from said substantially annular free space to a region of said mixing zone close to an inner wall of said second conduit;

expanding and directing said free oxygen flow exiting said first conduit toward said inner wall of said second conduit in said mixing zone, thereby to mix and react a first portion of said free oxygen flow with a first flow comprising reacted gases circulating inside said reaction chamber in a central zone thereof, and to mix a second portion of said free oxygen flow with said hydrocarbon flow obtaining a flow comprising both hydrocarbons and free oxygen at least partly mixed together.

5. The process according to claim 4, wherein said free oxygen flow is caused to flow through said first conduit along a spiral flow path.

6. The process according to claim 4, wherein said second portion of the free oxygen flow is caused to contact said hydrocarbon flow from said first conduit end onwards.

7. The process according to claim 2, wherein it further comprises the steps of:

causing said free oxygen flow to flow through a first, substantially cylindrical conduit of predetermined length of a burner extending into said reaction chamber;

causing said hydrocarbon flow to flow through a substantially annular free space defined between said first conduit and a second outer conduit coaxial with the first;

causing a gas flow comprising steam and/or inert gases to flow through a substantially annular free space defined between said second conduit and a third outer conduit coaxial with the second conduit;

feeding said gas flow comprising steam and/or inert gases into said reaction chamber as a substantially annular jet defining a mixing zone on its interior for said hydrocarbon flow and said free oxygen flow;

directing said hydrocarbon flow from said substantially annular free space to a region of said mixing zone near said substantially annular jet of the gas flow comprising steam and/or inert gases;

expanding and directing said free oxygen flow exiting said first conduit toward said substantially annular jet of the gas flow comprising steam and/or inert gases in said mixing zone, thereby to mix and react a first portion of said free oxygen flow with a first flow comprising reacted gases circulating inside said reaction chamber in a central zone thereof, and to mix a second portion of said free oxygen flow with said hydrocarbon flow obtaining a flow comprising both hydrocarbons and free oxygen at least partly mixed together.

8. The process according to claim 7, wherein said free oxygen flow is caused to flow through said first conduit along a spiral flow path.

9. The process according to claim 7, wherein said second portion of the free oxygen flow from said first conduit end onwards.

10. The process according to claim 1, wherein said second portion of the free oxygen flow comprises 10 to 90% of said free oxygen flow.

11. The process according to claim 1, wherein the hydrocarbons flow is fed into said reaction chamber at a velocity in the range of 30 to 300 m/s and the free oxygen flow is fed into said reaction chamber at a velocity in the range of 10 to 100 m/s.

* * * * *